Nov. 24, 1959     T. E. WARE     2,913,847
FISH LURE
Filed June 7, 1956
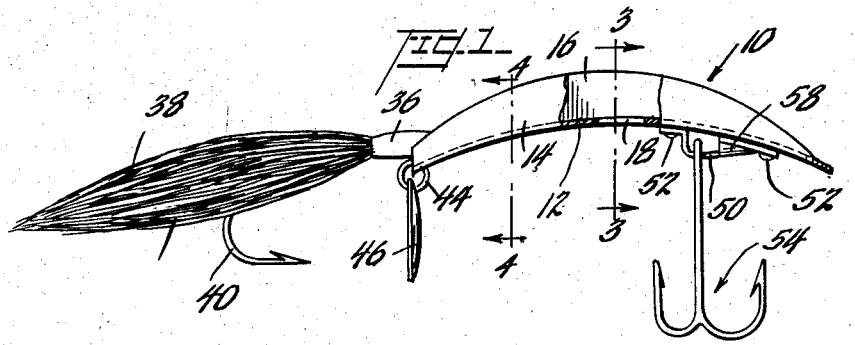
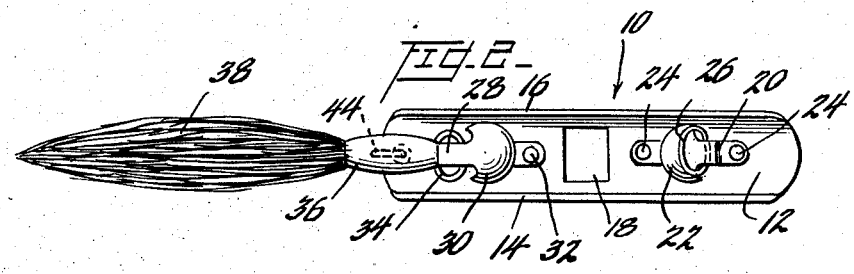
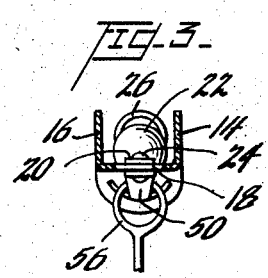
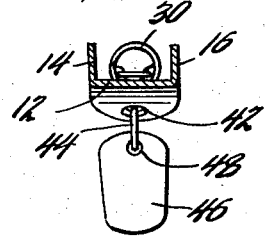
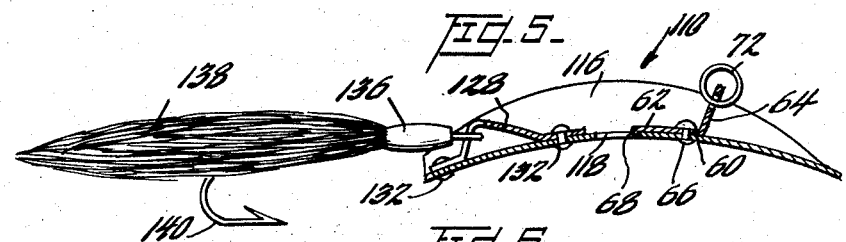
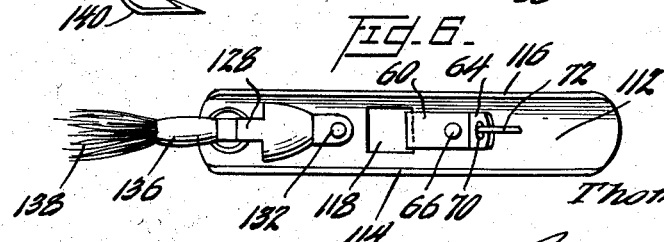
INVENTOR
*Thomas E. Ware,*
BY *Parker and Walsh*
ATTORNEYS

United States Patent Office 2,913,847
Patented Nov. 24, 1959

2,913,847

FISH LURE

Thomas E. Ware, Sedalia, Mo.

Application June 7, 1956, Serial No. 590,026

4 Claims. (Cl. 43—42.06)

This invention relates to an improved fish lure and more particularly to a combination plug and fly lure.

One object of the invention is the provision of an artificial bait which will attract game fish.

Another object of this invention is to produce a lure that has a life-like movement imparted thereto as it travels through the water.

These and other objects will appear in connection with the following specification and accompanying drawing which constitute a full disclosure of the invention.

In the drawing:

Figure 1 is a side elevation partly in section of a preferred form of the lure;

Figure 2 is a top plan view;

Figure 3 is a section substantially on the line 3—3 of Figure 1 looking in the direction of the arrows;

Figure 4 is a section substantially on the line 4—4 of Figure 1 looking in the direction of the arrows;

Figure 5 is a longitudinal section of a modified arrangement; and

Figure 6 is a plan view of the lure of Figure 5.

Referring to Figures 1 to 4, the lure 10 includes plug portion comprising a channel shaped member having an upwardly bowed bottom 12 and crescent shaped sides 14 and 16. About midway of the bottom 12 there is a rectangular opening 18, for a purpose later to appear.

On the upper side of the channel bottom 12 near the forward end thereof, there is a loop member 20 having a substantially dome shaped rear portion 22. The loop 20 is suitably attached to the bottom 12 as by rivets or spot welds 24. A ring 26 embraces the loop 20 for the purpose of attaching the lure to a line or leader.

Near the rear or trailing end of the lure, on the upper side of the channel bottom 12, there is placed a loop 28, similar to the loop 20, and having a forward substantially dome shaped portion 30. The loop 28 is suitably attached to the channel bottom 12 as by rivets or spot welds 32. A ring 34 embraces the loop 28 and carries a sleeve 36 which embraces the buck tail fly member 38 having a hook 40 partially embedded therein.

Near the rear end of the channel bottom 12 there is provided an opening 42. A ring 44 passes over the end of the channel bottom 12 and through the opening 42. A somewhat spoon shaped member 46 having an opening 48 near one end thereof is attached by means of the opening 48 to the ring 44.

Near the forward end of the lure 10, on the underside of the channel bottom 12 I provide a loop member 50 suitably attached as by spot welds or rivets 52. A hook 54 is attached by means of the ring 56 to the loop 50. The forward portion of the loop 50 is streamlined as at 58.

In Figures 5 and 6 a modified lure 110 is shown, having a bowed bottom 112 and crescent shaped sides 114 and 116. An opening 118 is provided about midway of the channel bottom 112. Near the rear portion of the channel bottom 112 a strap 128 is fastened by means of rivets 132 and carries the sleeve 136, the fly 138 and the hook 140 similar to the previously described like mentioned elements.

An angle bracket 60 having a substantially horizontal portion 62 and a substantially upright portion 64 is attached to the upper side of the channel bottom 112 by means of a rivet 66. One end of the portion 62 is turned down as at 68. In the portion 64 there is provided a ring 72 for attachment of the lure to a line or leader.

When the lure 10 is attached to a lure and is drawn through the water, the curvature of the channel coupled with the freely movable spoon 46 causes an undulating motion which is quite life-like. The opening 18 permits the lure 10 to settle into the water without undue disturbance.

It is to be understood that my lure will be made in sizes and weights for various fish and several styles of fishing, such as fly and plug fishing. I term the action of my lure a spoon-plug action, and the attached fly aids in creating a life-like motion of a crippled minnow, an eel or the like. This new spoon lure may be used with other flies than the one illustrated, without departure from the spirit of my invention.

It is to be understood that various modifications may be made within the skill of the art and the scope of the appended claims.

I claim:

1. A fish lure comprising a plug portion and a fly portion the plug portion constituted of a thin metal blank, formed into an upwardly facing opening channel, said channel being arched upwardly in a smooth curve from front to rear, the flanged side members having a crescent shape to blend smoothly with the web of the channel, at the ends thereof, increasing in height to a maximum substantially at the highest portion of the arch, an elongated opening formed in the web of the channel intermediate the ends thereof, said channel being free of obstructions above and below said opening for a short distance to allow the passage of water through said opening, when the lure is drawn through the water, to modify the motion of the lure as it is so drawn; line attaching means at the forward end of the channel; a hook suspended from the underside of the channel between the forward and mid points of the arch and in advance of the opening of the web; and means at the rear of the plug portion flexibly connecting the plug and fly portions.

2. The lure according to claim 1 having a spoon portion movably attached near the rear thereof.

3. The lure of claim 1 wherein the line attaching means is located between the forward end and the middle of the lure.

4. The lure of claim 1 wherein the fly portion is connected to the plug portion in advance of the rear of the plug portion.

References Cited in the file of this patent

UNITED STATES PATENTS

| | | |
|---|---|---|
| 1,499,689 | Pflueger et al. | July 1, 1924 |
| 1,609,090 | Knill | Nov. 30, 1926 |
| 1,946,979 | Liotta | Feb. 13, 1934 |
| 2,218,259 | Finucan | Oct. 15, 1940 |
| 2,484,747 | Russell | Oct. 11, 1949 |
| 2,511,002 | Perry | June 13, 1950 |
| 2,517,495 | Kneece | Aug. 1, 1950 |
| 2,555,435 | Caen | June 5, 1951 |
| 2,619,760 | Maddux | Dec. 2, 1952 |
| 2,741,057 | Morris et al. | Apr. 10, 1956 |
| 2,753,649 | Sporket | July 10, 1956 |